INVENTOR.
JOHN A. McCONNELL
EVERETT W. WILLIAMSON
BY
Allen and Brown
ATTORNEYS

United States Patent Office 3,401,840
Patented Sept. 17, 1968

3,401,840
BLOW MOLD DISPENSING CONTAINER
John A. McConnell and Everett Wayne Williamson, Newark, Calif., assignors to McConnell, Inc., Newark, Calif., a corporation of California
Filed Mar. 27, 1967, Ser. No. 626,294
1 Claim. (Cl. 222—158)

ABSTRACT OF THE DISCLOSURE

A liquid dispensing container which is provided with a liquid measuring tube that is attached to the top of the container so that the interior of the tube communicates with the interior of the container. The top part of the tube is of generally arcuate shape and this part is arched over the top of the container and spaced therefrom to provide a handle for the container. The bottom part of the tube is positioned parallel to the side of the container and terminates in an elbow which is substantially at the level of the bottom of the container and which is provided with a mouth having a snap-on closure attached thereto, said mouth facing away from the container. The tube is adapted to be filled with liquid to different levels by tilting the container so that liquid flows into the tube over a barrier whereby the tube is adapted to be filled with liquid to different calibrated levels.

---

This invention relates to a dispensing container made of plastic or the like provided with an elongated calibrated tubular member integral therewith for dispensing measured quantities of liquid, said tubular member also functioning as a handle for the container.

An object of this invention is to provide a dispensing container having a combined handle and dispensing tubular member integral therewith which is provided with volumetric calibrations and which may be filled with liquid from the container to different calibrated levels thereof whereby predetermined amounts of liquid may be dispensed from the container from the bottom of the tubular member.

Another object of this invention is to provide an improved dispensing container made of plastic or the like, said container being provided with a tubular member attached to the top thereof and arched over the top of the container so that this tubular member may be used as a handle, said tubular member being provided with calibrations indicating the volume thereof, said tubular member also being adapted to be filled with liquid from the container to different calibrated levels thereof whereby predetermined amounts of liquid may be dispensed from the tubular member by opening the closure provided to the bottom thereof.

Other and further objects of this invention will be apparent to those skilled in the art to which it relates from the following specification, claim and drawing, in which, briefly:

Figure 1:
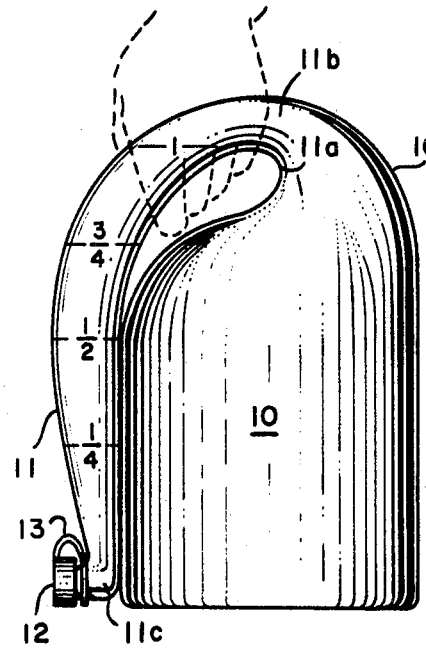
FIG. 1 is a view in side elevation of an embodiment of this invention.

Referring to the drawing in detail, reference numeral 10 designates the hollow body structure of the container which is made of plastic, glass, metal or the like. The hollow body structure may be of generally circular shape provided with a bottom, substantially circular side walls, and a top. A tubular member 11 with an outer arcuate shape is provided with a flared upper end which is integral with the top of the hollow body structure 10 so that the interior of the tubular member 11 communicates with the interior of the body structure 10. It will be noted that the outer side of the tubular member 11 is continuous with the outer side 10a of the body structure, and these sides form the arcuate top structure of the container. The opposite side of the tubular member 11 is also continuous with the inner side of the hollow body structure, and these sides form a dam-like structure 11a.

Figure 2:
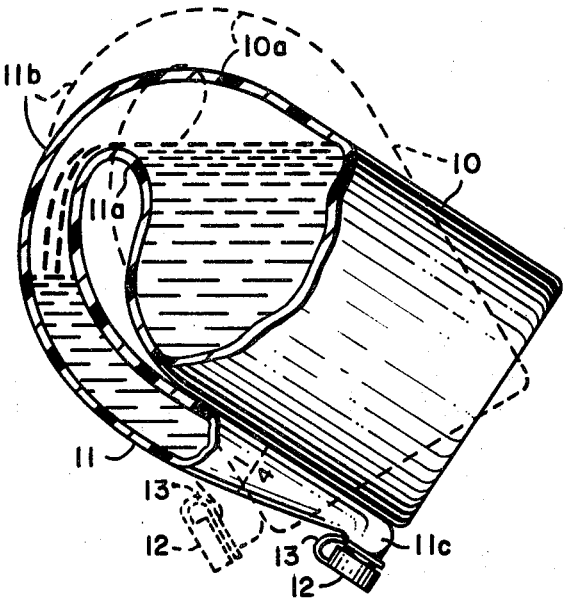
FIG. 2 is a view partially in section showing the container being tilted to fill the calibrated tubular member attached to the container to different levels with liquid from the container.
Figure 3:
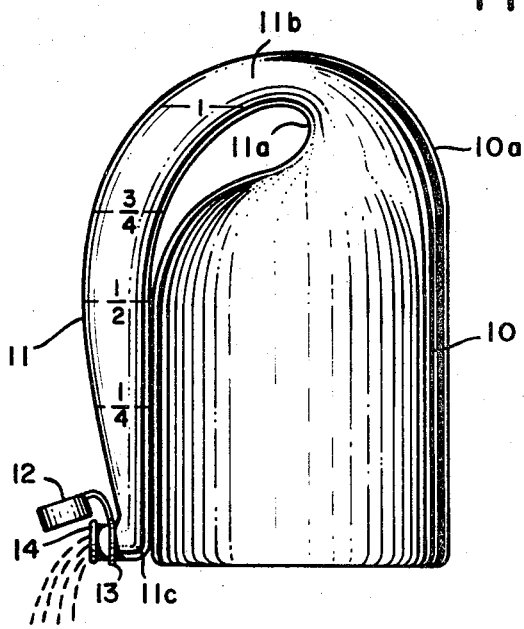
FIG. 3 is a view similar to FIG. 1 showing the closure removed from the bottom end of the calibrated tubular member so that a predetermined volume of liquid may be released therefrom.

The tubular member 11 may be filled with liquid from the container structure 10 by tilting the container so that liquid flows into the tubular member 11 over the curved barrier or dam 11a when the container is tilted so that the tubular member 11 is under it, as shown in FIG. 2. The curved portion 11b of the tubular member 11 is made of a shape to fit the grip of a person's hand, as shown in FIG. 1. This portion of the tubular member is arched over the top of the body structure 10 and a space is provided between the top of the body structure 10 and the bottom of this tubular member so that the person's hand may be inserted therein to substantially encompass and grip the portion 11b when this part is used as a handle for the container.

The tubular member 11 extends down alongside of the body structure 10 and the bottom thereof is provided with an elbow 11c having an opening 14 facing away from the container body. The side of the tubular member 11 facing the body may be cemented to the outside of the body structure 10, if desired. The tubular member 11 is provided with suitable volumetric calibrations to indicate the volume of liquid therein at different levels. This calibration may indicate in ounces the quantity of the liquid contained in the container that the tubular member will hold, or it may be in fractions of a cup. Other calibrations such as cubic centimeters, teaspoons or tablespoons may also be used, if desired.

A snap-on closure 12 is provided to the elbow 11c for closing the mouth 14 at the bottom of the tubular member. This snap-on closure is attached to the elbow at the bottom of the tubular member 11 by the plastic strap 13 which is either integral with the closure 12 or cemented thereto and which is provided with a loop that is adapted to be stretched over the bottom part of the tubular member adjacent to the mouth 14.

While we have shown a preferred embodiment of the invention, it will be understood that the invention is capable of variation and modification from the form shown so that the scope thereof should be limited only by the proper scope of the claim appended hereto.

What we claim is:

1. In a dispensing container made of plastic or the like for dispensing different measured quantities of liquid, the combination comprising a hollow body structure having top, bottom and side walls, said body structure being adapted to contain a liquid, a tubular member having a predetermined volume, said member having one end thereof connected with said top of said body structure, said one end being open into the interior of said body structure, a portion of said tubular member being arched over the top of said body structure and spaced therefrom so that said portion of said tubular member may be gripped and used as a handle to carry the container, another portion of said tubular member depending from said first mentioned portion and being positioned alongside of said body structure, said other portion of said tubular member being integral with said hollow body structure with one side of said last mentioned portion of said tubular member which extends adjacent to the bottom of said hollow body structure, the opposite sides of said hollow body structure and said tubular member being also continuous to form a dam-like structure over which the liquid in the hollow body structure flows into said tubular member when the container is tilted so that at least part of said tube is under said hollow body structure the bottom end of said other portion of said tubular member having a closure attached thereto for closing said tubular member and an elbow with the open end thereof facing away from said hollow body structure adjacent to the bottom of said hollow body structure and said closure is adapted to fit over said open end, said tubular member being adapted to be filled from said hollow body structure by tilting said body structure a predetermined amount depending on the level of liquid in said body structure whereby a predetermined amount of liquid may be dispensed from said tubular member when said closure is removed therefrom.

References Cited

UNITED STATES PATENTS

| | | | |
|---|---|---|---|
| 570,759 | 11/1896 | Law | 222—456 |
| 836,466 | 11/1906 | Sears | 222—456 |
| 2,017,209 | 10/1935 | Kennedy | 222—158 |
| 2,980,297 | 4/1961 | Tucci | 222—158 |
| 3,141,574 | 7/1964 | Donoghue | 222—158 X |

ROBERT B. REEVES, *Primary Examiner.*

NORMAN L. STACK, JR., *Assistant Examiner*